(12) United States Patent
Randall et al.

(10) Patent No.: US 9,312,801 B2
(45) Date of Patent: Apr. 12, 2016

(54) CONTROL OF A BRUSHLESS ELECTRICAL MACHINE

(71) Applicant: NIDEC SR DRIVES LTD., North Yorkshire (GB)

(72) Inventors: Steven Paul Randall, Leeds (GB); Mark John Cherney, Potosi, WI (US)

(73) Assignee: NIDEC SR DRIVES, LTD, Harrogate (GB)

( * ) Notice: Subject to any disclaimer, the term of this patent is extended or adjusted under 35 U.S.C. 154(b) by 230 days.

(21) Appl. No.: 14/190,013

(22) Filed: Feb. 25, 2014

(65) Prior Publication Data

US 2014/0239862 A1  Aug. 28, 2014

Related U.S. Application Data

(60) Provisional application No. 61/769,456, filed on Feb. 26, 2013.

(30) Foreign Application Priority Data

Feb. 26, 2013 (GB) .................................. 1303417.8

(51) Int. Cl.
*H02P 6/14* (2006.01)
*H02P 23/00* (2006.01)
*H02P 7/298* (2006.01)

(52) U.S. Cl.
CPC .............. *H02P 23/004* (2013.01); *H02P 7/298* (2013.01); *H02P 23/0036* (2013.01)

(58) Field of Classification Search
USPC ......... 318/400.01, 400.42, 602, 43, 738, 244, 318/254.1
See application file for complete search history.

(56) References Cited

U.S. PATENT DOCUMENTS

| 4,926,105 | A | * | 5/1990 | Mischenko | H02P 21/06 318/800 |
| 5,532,567 | A | * | 7/1996 | Iwasaki | H02P 25/082 318/400.13 |
| 6,922,036 | B1 | * | 7/2005 | Ehsani | H02P 25/088 318/432 |
| 2004/0178757 | A1 | * | 9/2004 | Petersen | H02K 21/12 318/400.11 |

FOREIGN PATENT DOCUMENTS

| EP | 0769844 | 4/1997 |
| EP | 0930694 | 7/1999 |

OTHER PUBLICATIONS

Miller, Tje, "Electronic Control of Switched Reluctance Machines", Newnes Power Engineering Series, Jul. 9, 2001, pp. 92-97, $1^{st}$ Edition, Woburn, MA.

(Continued)

*Primary Examiner* — Shawki S Ismail
*Assistant Examiner* — Jorge L Carrasquillo
(74) *Attorney, Agent, or Firm* — Haynes and Boone, LLP

(57) ABSTRACT

A brushless electrical machine has at least one phase winding which produces torque to drive a load. The control system for the machine is able to vary the flux and current supplied to a phase so as to vary the torque output as a function of the rotor position. The energization is reduced at particular angles to produce a dip in the torque profile, thus ensuring that, if the drive stalls, it does so at a predetermined position, for example where the losses in the drive are minimized.

20 Claims, 7 Drawing Sheets

(56) References Cited

OTHER PUBLICATIONS

Stepheson et al., "The Characteristics, Design and Applications of Switched Reluctance Motors and Drives", PCIM'93, Jun. 21-24, 1993, pp. 1-68, Conference & Exhibition, Seminar 5, Nürnberg, Germany.

* cited by examiner

CONTROL OF A BRUSHLESS ELECTRICAL MACHINE

CROSS-REFERENCE TO RELATED APPLICATIONS

This application claims priority to and the benefit of U.S. Provisional Patent Application No. 61/769,456 and Great Britain Patent Application 1303417.8, both tiled Feb. 26, 2013 and entitled "CONTROL OF A BRUSHLESS ELECTRICAL MACHINE," which are hereby incorporated by reference in their entirety.

TECHNICAL FIELD

This invention relates to the control of brushless electrical machines. The invention particularly, but not exclusively, relates to switched reluctance machines.

BACKGROUND

The switched reluctance machine is a type of brushless electrical machine. It comprises a rotor, defining rotor poles, a stator, defining stator poles, and a set of windings arranged in relation to the stator poles to define one or more independently energisable phases. In a reluctance machine, energisation of one or more phase windings sets up magnetic flux in a circuit which includes the associated stator poles, urging the rotor into a position where the reluctance of the circuit is a minimum (and the inductance of the associated phase winding is a maximum). In motoring operation, timing the sequential energisation of the windings according to rotor position induces rotor movement. A general treatment of electrical drives which incorporate switched reluctance machines can be found in various textbooks, e.g. "Electronic Control of Switched Reluctance Machines" by T J E Miller, Newnes, 2001 which is incorporated herein by reference. More detail is provided in the paper 'The Characteristics, Design and Applications of Switched Reluctance Motors and Drives' by Stephenson and Blake, presented at the PCIM '93 Conference and Exhibition at Nurnberg, Germany, Jun. 21-24, 1993 which is incorporated herein by reference. As is well known in the art, these machines can be operated as motors or generators by altering the timing of the application of the energisation to the phase windings.

Unlike conventional induction and synchronous 'electromagnetic' machines, e.g., so-called brushless DC machines, in which the current is in stator coils and the field is produced by permanent magnets on the rotor, switched reluctance machines are purely 'magnetic' machines. The torque is produced solely by the magnetic field as the reluctance of the magnetic circuit changes. It follows that the methods of controlling the two types of machine are quite different, since the control is related to the method of torque production. In general, the control methods used for sinusoidally fed conventional machines are inappropriate for switched reluctance machines.

FIG. 1 shows a typical switched reluctance machine in cross section. In this example, the ferromagnetic stator 10 has six stator poles 12. The ferromagnetic rotor 14 has four rotor poles 16. Each stator pole carries a coil 18. The coils on diametrically opposite poles are connected in series to provide three phase windings. Only one phase winding is shown, for clarity. The control of the switched reluctance machine can be achieved in a variety of ways well known to the person skilled in the art. If information on the angular position of the rotor is available, e.g. from a position transducer, the excitation can be applied as a function of the position. Such machines are often referred to as "rotor position switched machines".

A typical switched reluctance drive is shown in FIG. 2. In this example, the machine 36 corresponds to that shown in FIG. 1. The three phase windings, A, B and C, are switched in turn onto a DC supply V by a set of power electronic switches 48. The moments (i.e., the rotor positions) at which the switches operate are determined by the controller 38, which may be implemented either in hardware or in the software of a processing device such as a microcontroller or digital signal processor. The control signals are sent to the switches via a data bus 46. Closed loop current feedback is provided by sensing the phase currents using a current sensor 44 and feeding back a signal proportional to phase current which is compared to a demanded current $i_D$. The control algorithms may include a proportional (P), proportional-plus-integral (P+I), time optimal, feedback linearised, proportional/integral/derivative (PID) function, or one of many others as is well understood in the art. It is also common for an outer control loop of position or speed to be provided by feeding back a rotor position signal from a position detector 40.

In operation, a signal corresponding to current demand 42 is provided to the controller. This regulates the current in the windings, according to the particular control scheme adopted, to produce the desired output from the machine.

The performance of a switched reluctance machine depends, in part, on the accurate timing of phase energisation with respect to rotor position. Detection of rotor position is conventionally achieved by using a physical rotor position transducer (RPT) 40, shown schematically in FIG. 2, such as a rotating toothed disk mounted on the machine rotor, which co-operates, for example, with an optical or magnetic sensor mounted on the stator. A pulse train indicative of rotor position relative to the stator is generated and supplied to the processing device, allowing accurate phase energisation. Alternative methods of position detection include the so-called "sensorless" methods, in which there is no physical position transducer and the position is deduced from measurements of one or more other parameters of the machine.

Since current in the windings is relatively easy to measure, closed-loop control of the machine is conventionally accomplished by monitoring and controlling the energising current in the windings. However, the desired output of the machine is usually torque, position or speed, and current has a highly non-linear relationship to all of these. The result is that current control techniques generally incur inaccuracies in the output, such as torque ripple, position error and/or speed error. Many current control schemes have been devised to address these shortcomings, as will be discussed further below.

Many different power converter topologies are known, several of which are discussed in the Stephenson paper cited above. One of the most common configurations is shown for a single phase of a polyphase system in FIG. 3, in which the phase winding 32 of the machine is connected in series with two switching devices 21 and 22 across the busbars 26 and 27. Busbars 26 and 27 are collectively described as the "DC link" of the converter. Energy recovery diodes 23 and 24 are connected to the winding to allow the winding current to flow back to the DC link when the switches 21 and 22 are opened. A capacitor 25, known as the "DC link capacitor", is connected across the DC link to source or sink any alternating component of the DC link current (i.e. the so-called "ripple current") which cannot be drawn from, or returned to, the supply. In practical terms, the capacitor 25 may comprise several capacitors connected in series and/or parallel. Where parallel connection is used, some of the elements may be distributed throughout the converter. A polyphase system typically uses several "phase legs" of FIG. 3 connected in parallel to energise the phases of the electrical machine independently.

The phase inductance cycle of a switched reluctance machine is the period of the variation of inductance for the, or each, phase between common points in successive cycles (for example between inductance maxima when the rotor poles and the relevant respective stator poles are fully aligned). As explained in the Stephenson paper cited above, the maximum inductance region is centred around the rotor position where a pair of rotor poles are fully aligned with a pair of stator poles. Similarly, the minimum inductance region is centred around the position where the interpolar axis on the rotor is aligned with the stator pole axis, as shown in FIG. 1.

At low speeds, switched reluctance systems generally operate in a current-controlled or "chopping" mode. A hysteresis current controller using "hard" chopping is often used, as explained in the Stephenson paper referred to above. This is illustrated in FIG. 4(a) where the current cycles between an upper hysteresis level $I_u$ and a lower hysteresis level $I_l$ in a conduction region of the phase in question, between the switch-on angle $\theta_{on}$ at which the phase is energised and the switch-off angle $\theta_{off}$ at which energisation is removed. An alternative control regime is "soft" chopping in which only one switch is opened when the current reaches its upper level. The current then decays much more slowly through the winding, the second switch and one diode. This is shown in FIG. 4(b). Depending on the capability of the switches and the current controller, the width of the hysteresis band can be reduced until the current effectively becomes flat. If the angular speed of the rotor is slow, then the angle traversed by the rotor between switch-on and reaching the desired level is very small, so that the current waveshape appears to be rectangular, as will be discussed below. Other types of current controllers are well known in the art, for example those described in EP-A-0769844, which is incorporated herein by reference, off-time controllers, constant frequency controllers, etc., and will not be further described here.

At higher speeds, switched reluctance systems typically operate in the "single-pulse" mode of energisation instead of the chopping mode. This is also explained in the Stephenson paper referred to above.

Thus, systems generally use a chopping mode at low speeds and a single-pulse mode at higher speeds. The upper and lower chopping current levels are normally set to values above the expected peak current of the single pulse mode, so that these parameters do not interfere with single-pulse operation. It is known to set the upper current level to a value which would act as a "safety net" so that if a fault condition developed in the drive, the current would exceed this upper level and cause one or more switching devices to be opened, thereby limiting the current to a safe value.

While motoring operation has been assumed in the above discussions, it is well-known that switched reluctance machines operate equally well in the generating mode, in which the current waveforms are generally mirror images of the motoring waveforms.

Unlike some other types of electrical machine, the switched reluctance machine does not generally have a linear relationship between torque and current. The reasons for this are discussed in greater detail in the Miller book and the Stephenson paper cited above. The relationship is illustrated in FIG. 5, where the so-called static torque for one phase of the three-phase machine of FIG. 1 is shown for a constant current applied over a rotor angle of 45°. For a current low in the working range of the machine (say below 10%), the torque would be almost rectangular. However, as the flux and current levels are raised, the magnetic properties of the iron carrying the flux become significantly non-linear and the shape of the torque becomes rounded. The shape of torque curve shown is typical for the rated current for the machine.

It will be realised by those skilled in the art that the current waveform shown in FIG. 5 is idealised, since the practical waveform would typically have some chopping ripple superimposed on the average current shown.

FIG. 6 shows the relationships between the torque curves of the different phases of the machine. For the machine with 6 stator poles and 4 rotor poles, the angular displacement of the curves (the so-called "$\epsilon$ angle") is 30°. The simplest method of providing continuous torque from the machine as it rotates is to switch on a phase when the torque curves cross and to switch it off and switch on the next phase after the $\epsilon$ angle has been traversed. This is illustrated in FIG. 7, again for a constant phase current. While this is a simple control regime to implement, it has the obvious drawback of producing a large torque ripple. The minimum torque available at any angle is called the $\epsilon$ torque and is shown in FIG. 7. The average torque produced over the $\epsilon$ angle will be somewhere between the peak torque and $\epsilon$ torque, depending on the exact shape of the curve. This method has another drawback in that each phase is only being used for one third of the phase period, so the utilisation of the stator and the electronic controller is poor.

To overcome these disadvantages, it is known to excite every phase whenever it has the potential to produce torque in the desired direction. For the 3-phase machine shown, this gives an excitation pattern of Phase A alone for 15°, followed by A+B for 15°, followed by Phase B alone for 15°, etc. It is illustrated in FIG. 8 (which neglects any mutual interaction between the phases). This pattern is known variously as phase overlap or as "1½ phases on". It will be seen that the $\epsilon$ torque has been effectively doubled (because two phases are now producing identical torque at the previous crossover point and the slopes of the torque curves have approximately the same magnitude). Because the peak torque is unchanged, the torque ripple is much smaller and the average torque has significantly increased. Each phase is now used for one half of the phase period, so the stator utilisation is increased.

Although this excitation regime is adopted for many drives, there are some applications where a smoother torque is required without undue penalty on the current rating for the devices used to control the currents.

SUMMARY

In one aspect of the invention there is provided a method of controlling a brushless electrical machine to produce an output, where the output is a torque or a force, the method including energising a first phase of the machine in a conduction region between a switch-on point and a switch-off point and in response to an output demand, compensating for a nonlinear relationship between the output of the brushless electrical machine and a current in the first phase to produce a first output between an upper and a lower output limit, respectively higher and lower than the output demand, where the first phase is energised to produce the first output between the upper and lower output limits from a beginning of the conduction region to a detent region and from the detent region to an end of the conduction region and to produce a second output at a detent level in the detent region below the lower output limit, thereby favouring stalling of the machine at a detent position within the detent region.

Further aspects of the invention provide a control system and a drive having a brushless electrical machine and a control system coupled to the brushless electrical machine, the control system including a processor configured to cause the control system to perform the method of controlling the brushless electrical machine to produce the output.

In one embodiment, there is provided a method of controlling a brushless electrical machine to produce an output, wherein the output is torque or force. The method comprises energising a first phase of the machine in a conduction region between a switch-on point and a switch-off point. The machine is energised in response to an output demand to produce an output between an upper and a lower output limit, respectively higher or lower than the output demand, compensating for a non-linear relationship between the output of the brushless electrical machine and current in the first phase. The output between an upper and a lower output limit is produced in response to the output demand from a beginning of the conduction region to a detent region and from the detent region to an end of the conduction region. In the detent region, an output is produced at a detent level. The detent level is below the lower limit. In this way, stalling of the machine at a detent position within the detent region is favoured.

Advantageously, by controlling the brushless electrical machine to produce an output between upper and lower output tolerance limits outside the detent region and to control the machine to drop the output below the lower tolerance limit, a detent region within which the machine is more likely to stall can be defined. This provides control over the stalling behaviour of the machine In ideal conditions, the upper and lower output limits would be the same (equal to the output demand) so that the output would be ideally smooth or flat in the conduction region. In a real world context, the output fluctuations described above cannot be fully compensated so that the machine is controlled to produce an output at the output demand, which is substantially smooth or flat and varies between upper and lower limits due to uncompensated output fluctuations. For example, the upper and lower limits may be 5% on either side of the output demand, with flatter output potentially achievable, for example with upper and lower limits of 3% or even 1% or 2% on either side of the output demand (relative to the output demand). To achieve the substantially smooth or flat output any known output conditioning technique may be used, for example profiling of the current (or other controlled quantity, such as flux) to achieve the desired smoothness of the output. The control and/or profiling may be based on feed forward control based on the characteristics of the machine or feedback control based on a suitable feedback quantity, such as the output or variation of the output. A combination of feed forward and feedback control is equally possible. The various possible control schemes may employ sensorless forms of rotor position detection, or position detection using rotor position detector hardware. A combination of sensorless and hardware forms of rotor position detection is equally possible.

In some embodiments, the detent level is less than 96% of the output demand. For example, the detent level may be 95%. Lower or higher values for the detent level are equally possible, although the detent effect is reduced for higher values, while lower levels may introduce undesirable torque ripple.

In some embodiments, the method may comprise energising respective second and third phases together with the first phase. The second phase is energised together with the first phase for a first portion of the conduction region before the detent region and the third phase is energised together with the first phase for a second portion of the conduction region after the detent region to produce the output between the upper and lower limits. These embodiments may use the energisation scheme described above with reference to FIG. 8 to facilitate smoothing the output.

In some embodiments, as a result of controlling the machine to produce a substantially smooth output, the current drawn by the first phase for a constant output demand is above a notional level in a second and fourth portion of the conduction region. The second and fourth portions of the conduction region are located between first, third and fifth portions of the conduction region in which the current is below the notional level. Thus, the current profile (whether as result of direct current control or, for example, flux control) has two peaks with a trough in between. In some embodiments, the detent position is within the third portion, that is the trough portion between the two peaks of the current profile. In this way, the detent region is placed such that the detent position is within a region in which the current drawn by the first phase is relatively low. This means that the thermal load corresponding to the current drawn by the phase while stalling is reduced as compared to a situation in which the current drawn would be higher. The notional level may be less than the average of the maximum current in the conduction region of a first phase and the minimum current in the third portion of the conduction region of the first phase. The notional level may be less than the sum of 90% of the minimum current and 10% of the maximum current in the conduction region of the first phase. In some embodiments, the minimum of current in the third portion of the conduction region of the first phase occurs in the detent region. This results in the phase drawing minimum current (or close to minimum current) when stalling in the detent region.

In some embodiments, the brushless electrical machine is coupled to a load by a compliant torque transmission arrangement. The compliance of the transmission arrangement means that the machine may move to a stall position within the detent region without movement of the load. In some embodiments, the brushless electrical machine is coupled to one or more traction wheels of a vehicle, for example a loader as discussed below.

In some embodiments, the brushless electrical machine has more than one phase and the method comprises varying the output demand between at least two levels to cause the machine to stall at different detent positions, wherein each detent position is in a different phase. This allows the thermal load associated with the stall current to be shared between phases and thus can reduce heating of the machine in a stall condition. In particular, in some embodiments, the output demand is varied in response to detecting that the machine has stalled. The different phases may be mutually adjacent and for brushless electrical machines which have n phases, the output demand may be varied between n levels (to cause stall positions associated with each of the n phases to be visited).

In some embodiments, the brushless electrical machine has a rotor, that is it is a rotating machine with a torque output. However, the present disclosure is equally applicable to embodiments in which the machine has a movable part arranged for linear motion relative to a stationary part and is thus a linear machine with an output of force.

In some embodiments, the brushless electrical machine is a switched reluctance machine. In other embodiments, the brushless electrical machine may be a brushless DC machine or any other suitable type of brushless electrical machine.

In some embodiments, the introduction of a detent region with an output at a detent level is made speed-dependent. To this end, for example, a speed of the machine is determined and an output produced in the detent region at the detent level if the speed is below a first value and at or above the lower level if the speed is above a second value. The second value may be the same as the first value and act as a threshold level. Alternatively, the second value could be larger than the first value, for example by implementing a gradual transition from the detent level to no output reduction at all as the speed increases from the first to the second value. This would reduce the risk of resonances being introduced in the machine/drive by the torque ripple associated with the periodic reduction in output to the detent level in the detent region.

In other embodiments, there is provided a control system comprising means for controlling a brushless electrical machine in accordance with the methods and techniques described above. In yet further embodiments, there is provided a drive comprising a brushless electrical machine and a control system coupled to the brushless electrical machine. The control system comprises a processor configured to cause the control system to control the brushless electrical machine in accordance with the methods and techniques described above.

The scope of the invention is defined by the claims, which are incorporated into this section by reference. A more complete understanding of embodiments of the present invention will be afforded to those skilled in the art, as well as a realization of additional advantages thereof, by a consideration of the following detailed description of one or more embodiments.

BRIEF DESCRIPTION OF THE DRAWINGS

The present invention can be put into practice in various ways, some of which will now be described by way of example with reference to the accompanying drawings.

DETAILED DESCRIPTION

Some types of load are particularly susceptible to torque ripple produced by the prime mover and there are many techniques advocated for producing "smooth" torque, i.e. torque which has no significant variation with rotor position. Some of these techniques concentrate on mechanical solutions, e.g. modifying the profile of the rotor and/or stator poles, as disclosed in EP 0930694 (Randall). Other methods make the current a function of rotor angle, so that instead of being constant (as was shown in FIGS. 5 to 8), the magnitude of the current is varied during the conduction angle, as disclosed in U.S. Pat. No. 6,922,036 (Ehsani). These latter techniques are generally described as "current profiling".

Figure 9:
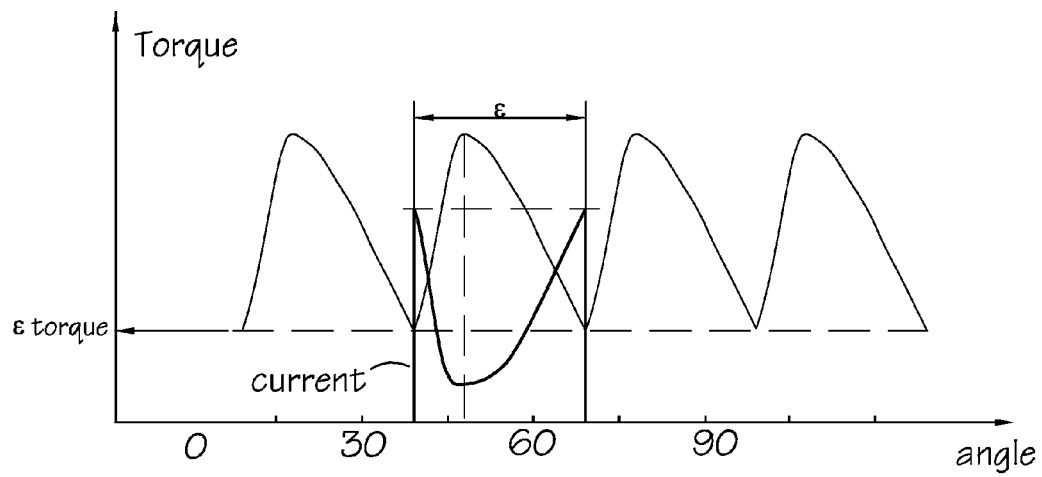
FIG. 9 shows a phase current profile for producing smooth torque over a given rotor angle in accordance with an embodiment.

The current profiling can be achieved in a variety of ways. One of the simplest methods follows from FIG. 7 and uses one phase at a time. During the $\epsilon$ angle for any phase, the current is modulated inversely to the shape of the torque to keep the torque constant across the $\epsilon$ angle. This is shown in FIG. 9. In practice, however, there are three disadvantages to this approach. Firstly, it is not possible to apply or remove the current to the phase instantaneously. Secondly, as already discussed above with reference to FIG. 7, the $\epsilon$ torque is quite low when only one phase is energised at a time, so the output from the machine has been reduced from the average torque of FIG. 7 (approximately twice the $\epsilon$ torque, depending on the actual wave shape) to the $\epsilon$ torque. Thirdly, because the current is only present over a small part of the electrical cycle and because it has high peaks, it has a relatively high RMS value, leading to relatively high winding losses for the torque produced.

Figure 1:
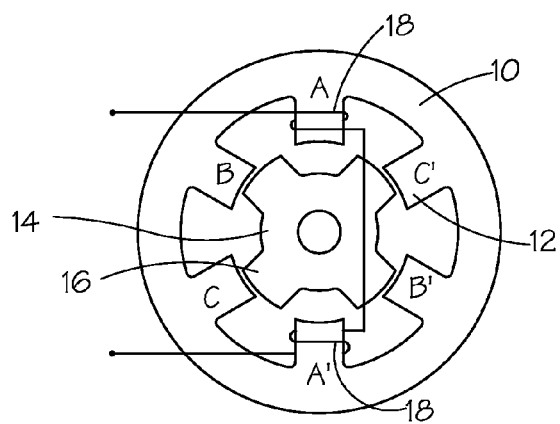
FIG. 1 shows a schematic axial cross-section of a switched reluctance machine.
Figure 3:
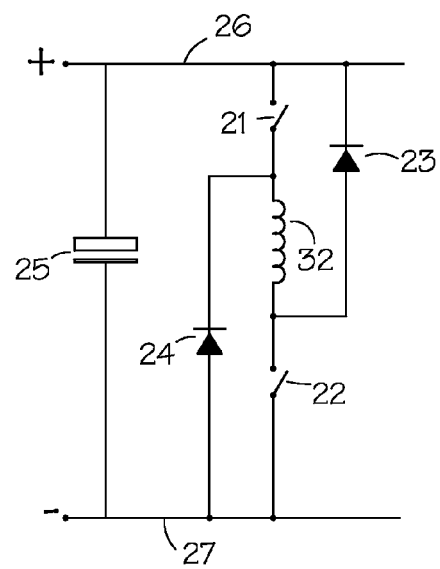
FIG. 3 shows part of a power converter circuit suitable for a switched reluctance machine.
Figure 2:
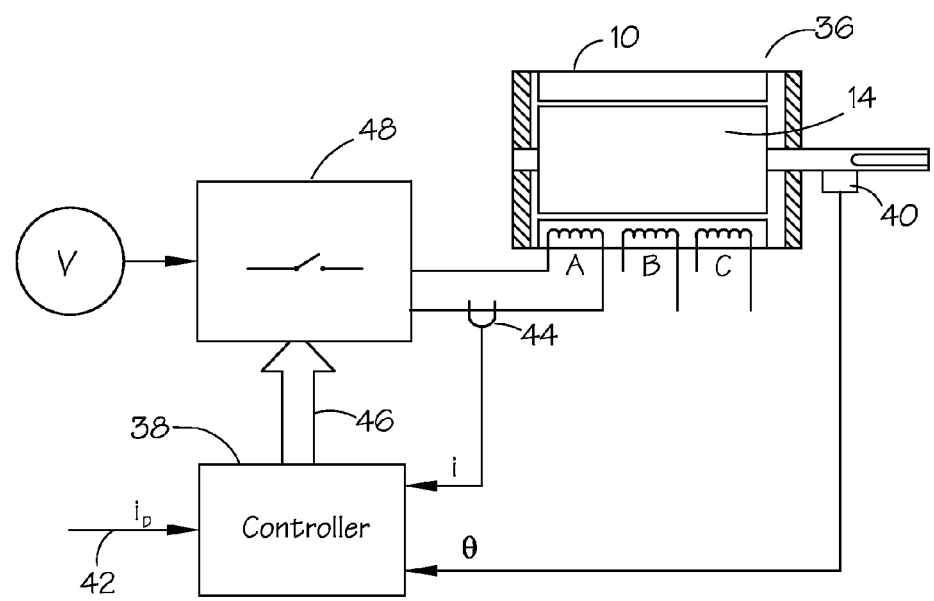
FIG. 2 shows a schematic diagram of a switched reluctance machine drive system.
Figure 4A:
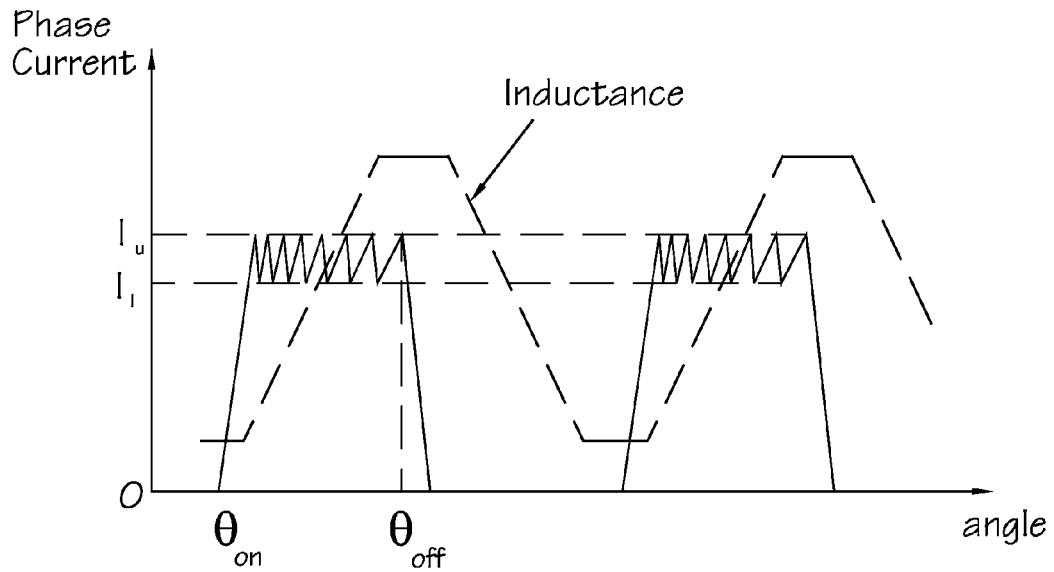
FIG. 4(a) shows a chopping current waveform and its angular relationship to an inductance profile.
Figure 4B:
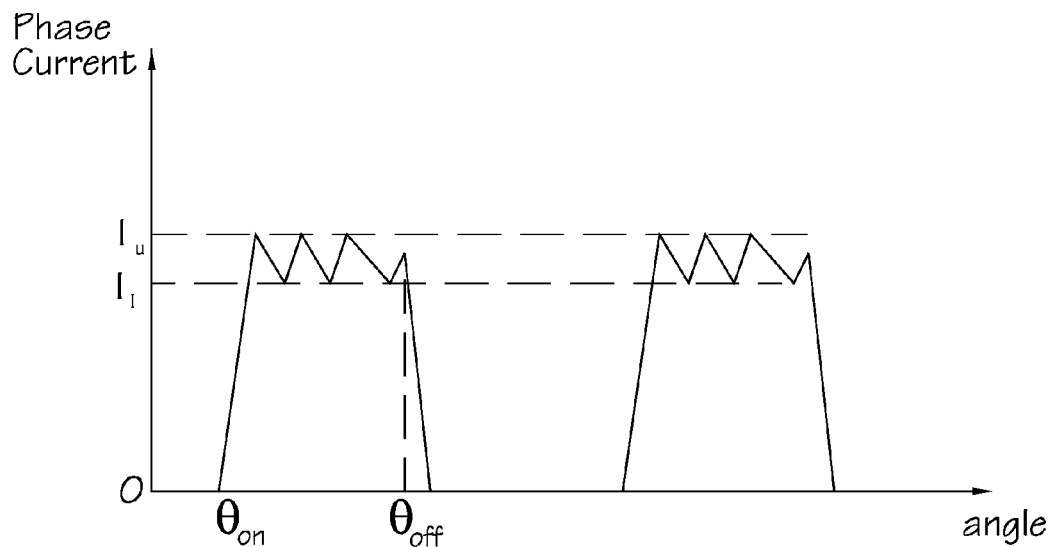
FIG. 4(b) shows a chopping current waveform incorporating freewheeling.
Figure 5:
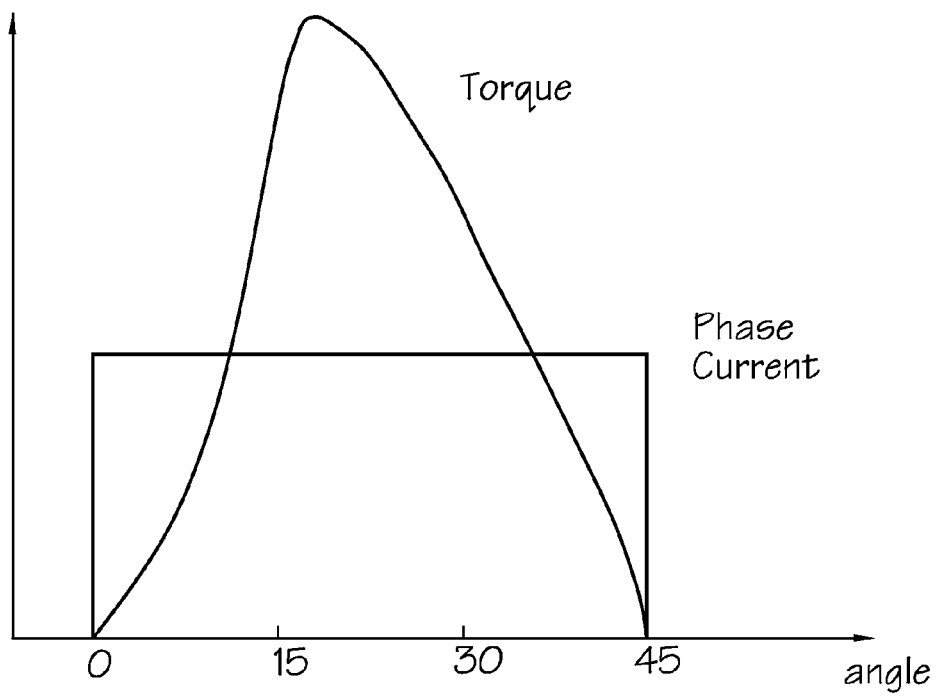
FIG. 5 shows torque and current waveforms for one phase of a machine.
Figure 6:
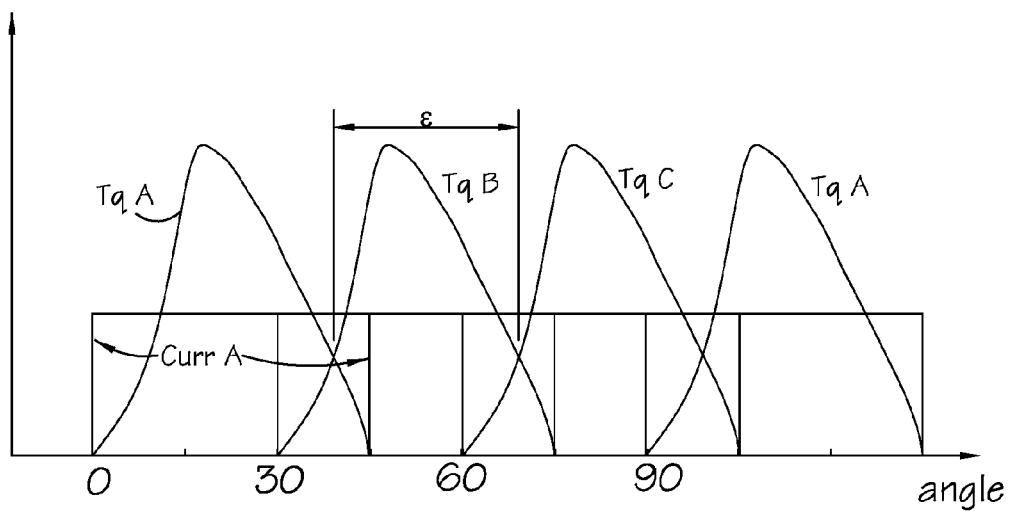
FIG. 6 shows the waveforms of FIG. 5 overlaid for the other phases of the machine.
Figure 7:
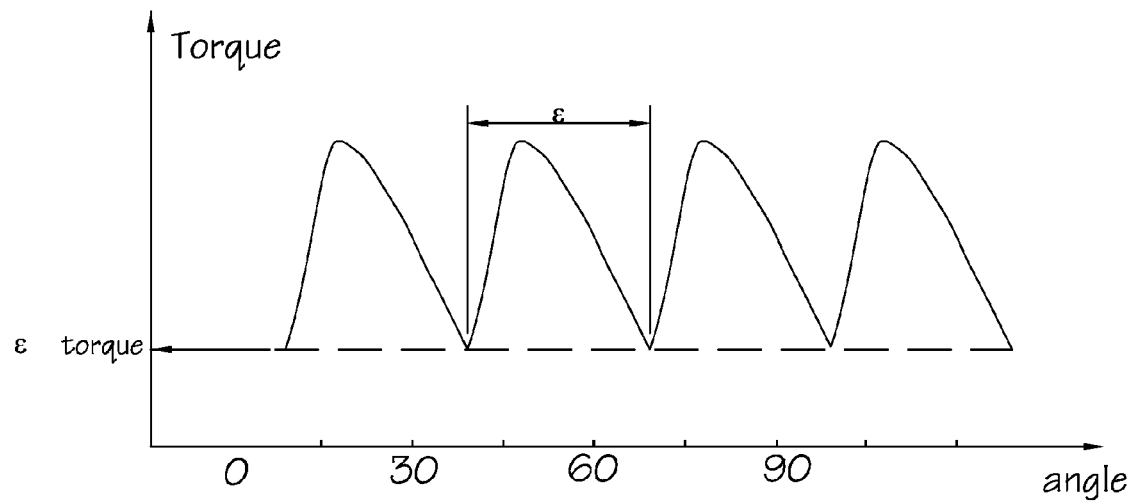
FIG. 7 shows a torque waveform produced by exciting one phase at a time.
Figure 8:
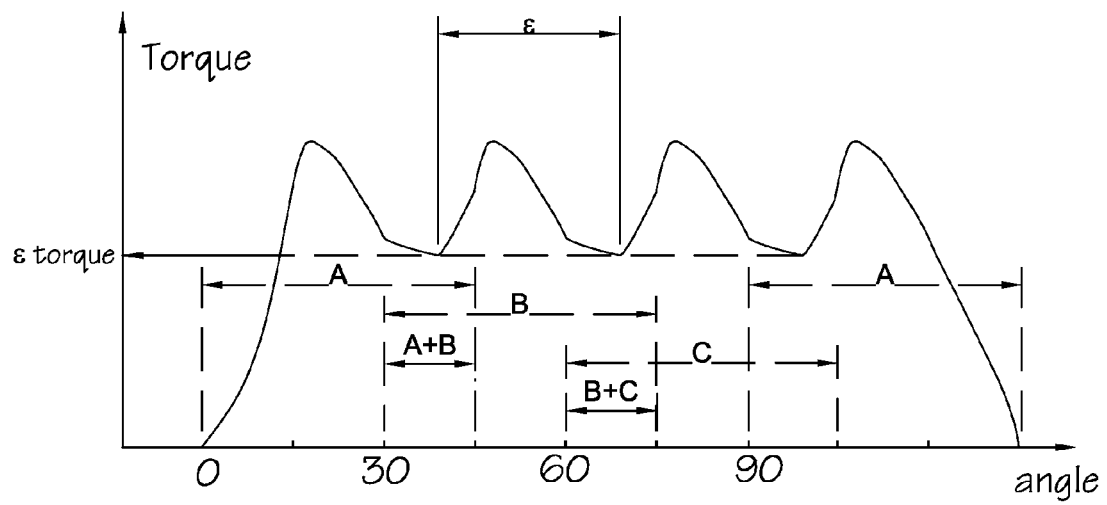
FIG. 8 shows a torque waveform produced by overlapping phases.

These disadvantages can be at least partly overcome by having two (or more) phases energised at some rotor angles, in the same manner as was illustrated in FIG. 8 above. The rising and falling edges of the phase currents are now profiled in such a way that the torque produced by the outgoing phase is coordinated with the torque produced by the incoming phase to give the constant value of torque required. This is illustrated for one phase in FIG. 10, where a constant, ripple-free torque can be achieved for a much smaller current than for the arrangement in FIG. 9.

Figure 10:
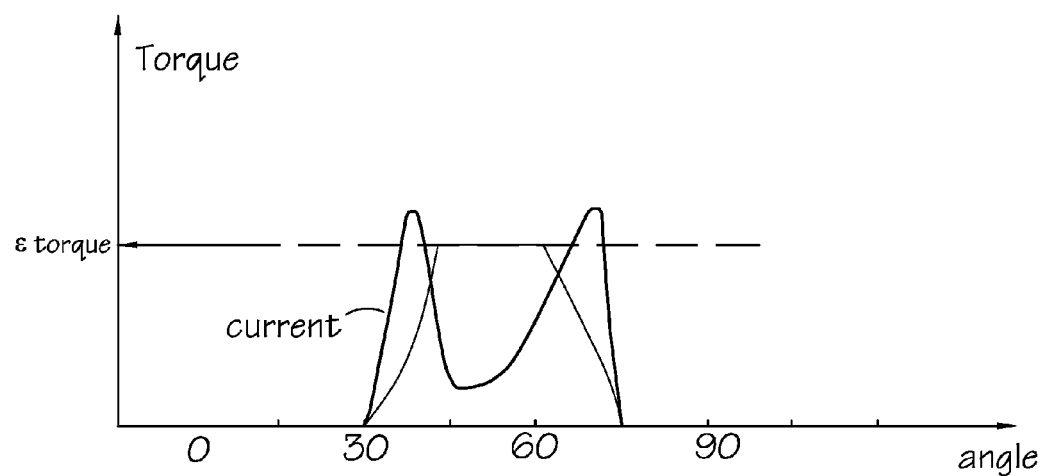
FIG. 10 shows a phase current profile which overlaps with another to give smooth torque in accordance with an embodiment.

While the $\epsilon$ torque in FIG. 10 is shown as a straight line corresponding to an ideally flat or smooth torque, in practice the torque output for a given torque demand will fluctuate somewhat about the torque demand, between an upper and lower level of acceptable torque fluctuation, for example due to model inaccuracies or limited feedback gains. As a result, in a real-world implementation, the torque output will be substantially flat or smooth, allowing for noise, inaccuracies or design constraints in the control process.

There are many different methods available for choosing the profile of the current to achieve this smooth torque, since there is no unique solution for the individual phase currents. For example: the paper "Torque ripple minimisation for variable reluctance motors", by Hung, J Y in Mechatronics, Vol 4, No 8, 1994, pp 785-794 discusses a very simple method, which ignores the problem of saturation in the magnetic circuits; "Optimum commutation-current profile on torque linearization of switched reluctance motors" by Schramm, D S, Williams, B W & Green T C, in the Proceedings of the International Conference on Electrical Machines, 15-17 Sep. 1992, Manchester, UK, Vol 2, pp 484-488 discloses a more complex method using look-up tables; and "A fuzzy iterative approach for determination of current waveform for switched reluctance motors using a torque sharing function at positive and negative torque production regions" by Gobbi, R & Sahoo, N C in the Proceedings of the 30th Annual Conference of the Industrial Electronics Society, 2-6 Nov. 2004, Busan, Korea, Vol 4, pp 3172-3177 invokes fuzzy logic methods to iterate towards a solution for the individual phase currents.

Common to all these methods is the energisation of a phase such that it carries a current that varies with rotor position to compensate (as fully as possible or partially) for the nonlinear relationship between the phase current and torque generated by the phase. Generally, the resulting current waveform will have two peaks with a trough in between to reflect torque generation characteristics which produce a higher torque for a given current in a middle region of the phase conduction region.

While the production of essentially ripple-free torque is often regarded as the best solution for applications requiring electrical drive systems, there is a class of applications where, surprisingly, this is not always the best overall solution. It is not uncommon that the torque required by the load exceeds that available from the drive, causing the system to stall. This can happen accidentally, or can be a deliberate event used to hold the load at a particular position. For example, if a hoist is being driven by a drive system and it is desired to hold the load at a particular height, then the load could be driven to a position and the torque reduced until the load is held at that position, thus avoiding the need to apply a brake. A further example is a traction drive for a vehicle which is scooping up loose material, e.g. a loader, where the vehicle is driven into a pile of material and held there while another operation is performed. This type of system is made more complicated by the presence of significant compliance in the rubber tyres which transmit the torque of the drive system to the ground. When the vehicle is moving along a smooth, constant gradient surface at steady speed, the compliance in the transmission of torque has no effect on the drive. However, if a stall condition is encountered, the tyres "wind up" as the drive continues to apply torque but the vehicle is prevented from moving.

Figure 11:
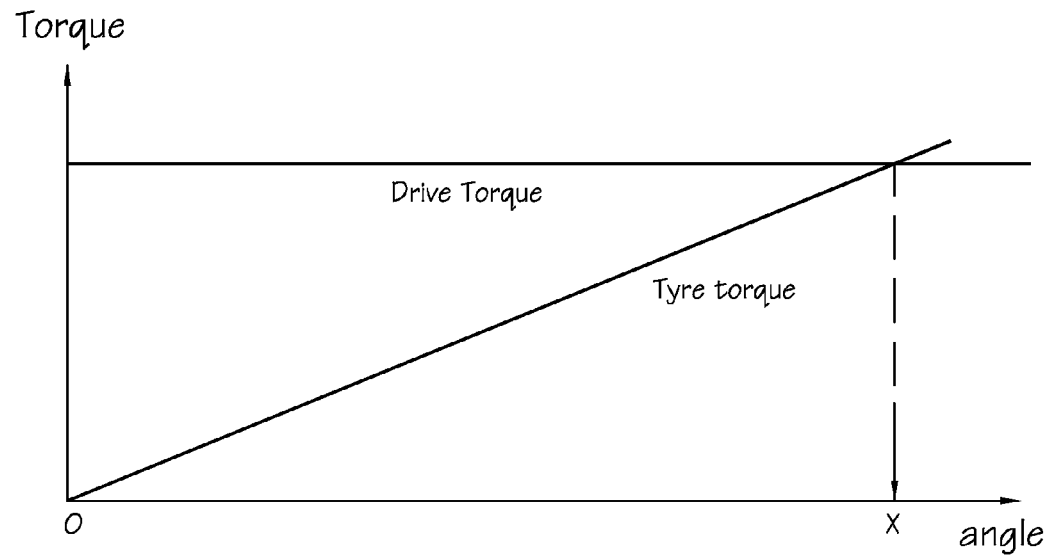
FIG. 11 shows drive and load torques in accordance with an embodiment.

This is illustrated in FIG. 11, where a smooth torque is supplied by the drive and winds up the compliance of the tyre until the tyre develops a torque equal to the drive torque, Point X. Typically, the gearing of a vehicle is such that the motor will have gone through many phase cycles, and possibly have turned several revolutions, in the wind-up process. It follows that a very small variation in the compliance (which could easily be caused by a change in ambient temperature, for example) could make a large difference to the particular position in the phase cycle where the rotor stops. Reference to FIG. 9 or FIG. 10 shows how the stall current could therefore easily change by a factor of 2 or 3. It follows that the associated losses in the winding and switching devices vary greatly, which leads to difficulty with the thermal management of the drive.

Figure 12:
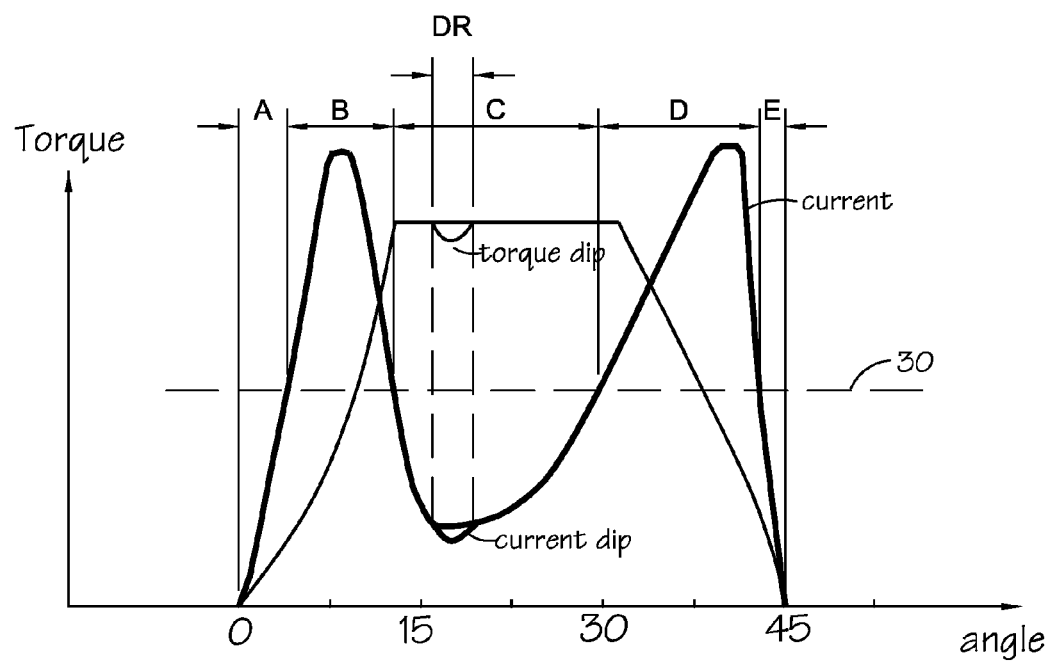
FIG. 12 shows torque and current waveforms in accordance with an embodiment.
Figure 13:
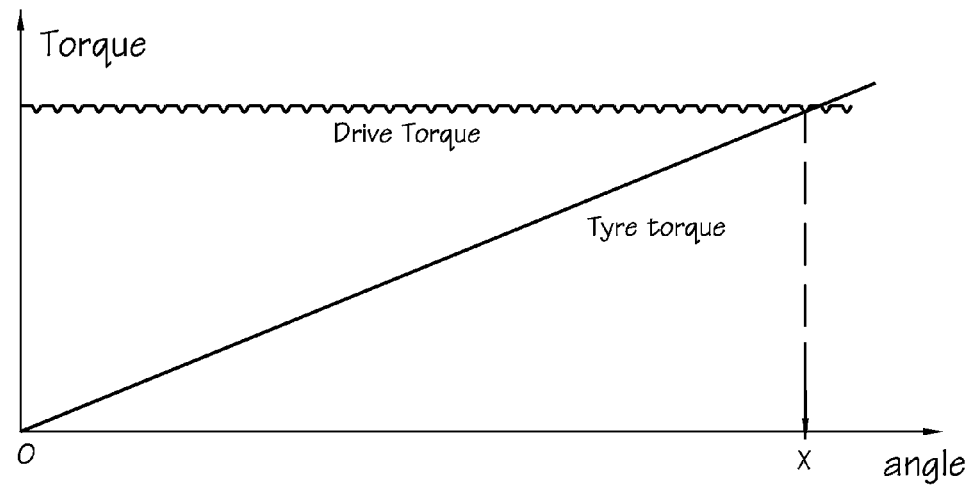
FIG. 13 shows torque waveforms in accordance with an embodiment.

In order to control or influence the rotor position at which the drive stalls, the current profile of the phase winding is altered in a detent region in the conduction region to ensure that the drive will stall at a point (or detent position) where the phase current is at or near its lowest value, thus minimising the associated losses in the drive system. FIG. 12 shows a small dip introduced to the current profile of FIG. 10 in a detent region DR to encourage stalling of the drive at a detent position within the detent region. This produces a corresponding dip in the torque, as shown. When this torque waveform is applied to the tyre compliance, it will be seen from FIG. 13 that the drive stalls at the torque dip, corresponding to the lowest current. This has the beneficial effects of not only controlling the rotor angle at which the drive stalls, but ensuring that the stall point is in the detent region at the lowest point in the current profile. Further, if the drive is a 3-phase drive, inspection of FIGS. 8 and 12 will show that, since the dip is placed in the middle third of the current waveform, there is no current in the adjacent phases at that point. This further eases the thermal management of the drive.

This technique is counter-intuitive, since it re-introduces some torque ripple to the output of the machine, which would normally be considered something to avoid. However, it is seen from the description above that the controlled departure from the smooth torque of FIG. 9 or FIG. 10 can be used to bring an overall benefit to the drive system by greatly easing the difficulties of thermal management under stall conditions.

The amount of torque dip needed will depend, inter alia, on the amount of compliance in the transmission of torque and the gearing between an electrical cycle of the machine and the load, but a typical value for a large industrial vehicle would be to introduce a torque dip of around 5% of the output torque.

Conceptually, a notional current level 30 can be drawn in FIG. 12 to divide the conduction region into five portions: two flanking portions A and E; a middle portion C in which the current is below the notional level; and two in-between portions B and D in which the current is above the notional level. Some benefit of stall current reduction can be achieved where the current (and hence torque) dip is introduced in the middle portion, where the current is lower than in the in-between portions. The benefit is higher, the lower the notional level. Optimum or near optimum stall current reduction may be achieved if the detent region is chosen to include the lowest point of the middle portion. By choosing the dip to occur in the middle portion, the current drawn by adjacent phases in some energisation schemes may also be reduced, depending on the positioning of the dip, the energisation scheme and the number of phases in the machine.

It may be useful to make the introduction of a detent region speed-dependent, so that a detent region is only introduced when the drive is operating at low speeds or when the speed is approaching zero and a stall condition is likely. This would reduce any possibility of the ripple in the torque causing resonances in the drive train.

While the technique described above can be used to greatly reduce the problem of thermal management in the stall condition, the loss is still concentrated in one phase winding and the phase leg of the converter supplying that phase. If the drive is stalled for a prolonged period, thermal limits may still be a consideration. A further aspect of the invention will now be described which can beneficially further improve the drive system. Inspection of FIGS. 12 and 13 will show that adjacent torque dips (and hence adjacent detent/stall positions) are associated with adjacent phases of the machine. It will be seen that, if the torque output is varied by a relatively small amount, the tyre torque line will intersect the drive torque profile on different dips. This is illustrated in FIG. 14, which shows an enlarged portion of FIG. 13.

Figure 14:
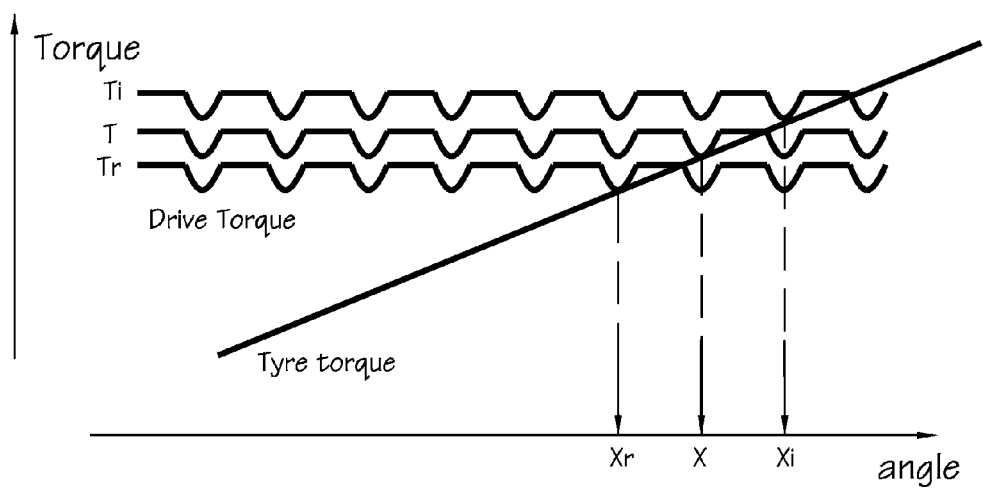
FIG. 14 shows torque waveforms in accordance with another embodiment.

In FIG. 14, the drive torque has been varied from its original value T to an increased value Ti and to a reduced value Tr. It will be seen that the load now causes the system to stall at new detent positions Xi and Xr, depending on the torque developed. The positions Xi, X and Xr each correspond to a position in the three phases of the machine used in this example. It will be clear that, for a system with a higher number of phases, a corresponding effect will be produced. In this way, the thermal load of the stall condition can be spread over some or all of the phases in the drive. For clarity, FIG. 14 has shown an exaggerated view of the movement on the angular scale but in practice the movement is relatively small and would not produce adverse effects on the load. While a similar effect might be obtained with a system which does not use profiled phase currents, the embodiment described above enables a controlled movement from one phase to another and ensures that the points at which the drive settles all correspond to the lowest obtainable thermal load on the drive.

The description above has illustrated the use of current profiling throughout the conduction angle. This can be implemented with the current controllers commonly used in drive systems. The invention, however, can be put into effect by using other parameters to control the level of energisation in the machine, e.g., the drive may include a flux controller and the energisation may be controlled by monitoring the flux in the machine and controlling it to follow a predetermined profile.

The description above has been made in terms of the example of a rotating machine having a rotor arranged for rotation relative to a stator to produce an output torque. The above description is equally applicable to linear machines having a moveable member linearly moveable relative to stationary member to produce an output force. It will be understood that in such a case reference to "rotor", "rotation", "torque", "angle", etc, can be replaced accordingly.

The invention in its various embodiments provides a torque control technique for electronically switched brushless machines of various types, and is particularly suited to switched reluctance machines. It allows close control of the thermal behaviour of the drive system. The disclosed embodiments illustrate a significant benefit, in that the additional control scheme can be incorporated into an existing control system with minimal modification. It will be apparent to the skilled person that various modifications and changes can be made to the specifically disclosed embodiments without departing from the invention. The invention is to be limited only by the scope of the following claims.

The invention claimed is:

1. A method of controlling a brushless electrical machine to produce an output, wherein the output is a torque or a force, the method comprising:
    energising a first phase of the machine in a conduction region between a switch-on point and a switch-off point and in response to an output demand, compensating for a nonlinear relationship between the output of the brushless electrical machine and a current in the first phase to produce a first output between an upper and a lower output limit, respectively higher and lower than the output demand,
    wherein the first phase is energised to produce the first output between the upper and lower output limits from a beginning of the conduction region to a detent region and from the detent region to an end of the conduction region and to produce a second output at a detent level in the detent region below the lower output limit, thereby favouring stalling of the machine at a detent position within the detent region, and
    wherein, for a constant output demand, the current drawn by the first phase is above a level in a second and a fourth portion of the conduction region between, respectively, a first and a third portion of the conduction region and the third portion and a fifth portion of the conduction region, the current being below the level in the first, third and fifth portion of the conduction region.

2. The method as claimed in claim 1, wherein the detent position is within the third portion of the conduction region.

3. The method as claimed in claim 2, in which the level does not exceed an average of a maximum current in the conducting region and a minimum current in the third portion.

4. The method as claimed in claim 3, in which the minimum current in the third portion occurs in the detent region.

5. The method as claimed in claim 1, further comprising energising respective second and third phases together with the first phase for a first portion of the conduction region before the detent region and for a second portion of the conduction region after the detent region to produce the output between the upper and lower output limits.

6. The method as claimed in claim 1, wherein the brushless electrical machine has more than one phase, each phase being energised as the first phase, the method further comprising varying the output demand between at least two levels to cause the machine to stall at different detent positions, and wherein each of the different detent positions is in a different phase.

7. The method as claimed in claim 1, wherein the method further comprises determining a speed of the machine and producing the second output in the detent region at the detent level if the speed is below a first value and producing the second output in the detent region at a level at or above the lower output limit if the speed is above a second value, wherein the second value is equal to or greater than the first value.

8. The method as claimed in claim 1, wherein the brushless electrical machine has the output of the torque or the force and is coupled to a load through a compliant transmission arrangement for transmitting the output to the load.

9. The method as claimed in claim 1, wherein the brushless electrical machine is coupled to one or more traction wheels of a vehicle.

10. The method as claimed in claim 1, wherein the brushless electrical machine is a switched reluctance machine.

11. A drive, comprising:
    a brushless electrical machine; and
    a control system coupled to the brushless electrical machine, the control system comprising a processor configured to cause the control system to control the brushless electrical machine to produce an output, wherein the output is a torque or a force by causing the control system to:
    energise a first phase of the machine in a conduction region between a switch-on point and a switch-off point and in response to an output demand, compensating for a nonlinear relationship between the output of the brushless electrical machine and a current in the first phase to produce a first output between an upper and a lower output limit, respectively higher and lower than the output demand,
    wherein the first phase is energised to produce the first output between the upper and lower output limits from a beginning of the conduction region to a detent region and from the detent region to an end of the conduction region and to produce a second output at a detent level in the detent region below the lower output limit, thereby favouring stalling of the machine at a detent position within the detent region, and
    wherein, for a constant output demand, the current drawn by the first phase is above a level in a second and a fourth portion of the conduction region between, respectively, a first and a third portion of the conduction region and the third portion and a fifth portion of the conduction region, the current being below the level in the first, third and fifth portion of the conduction region.

12. The drive as claimed in claim 11, wherein the detent position is within the third portion of the conduction region.

13. The drive as claimed in claim 12, in which the level does not exceed an average of a maximum current in the conducting region and a minimum current in the third portion.

14. The drive as claimed in claim 13, in which the minimum current in the third portion occurs in the detent region.

15. The drive as claimed in claim 11, wherein the processor is further configured to cause the control system to energise respective second and third phases together with the first phase for a first portion of the conduction region before the detent region and for a second portion of the conduction region after the detent region to produce the output between the upper and lower output limits.

16. The drive as claimed in claim 11, wherein the brushless electrical machine has more than one phase, each phase being energised as the first phase, wherein the processor is further configured to cause the control system to vary the output demand between at least two levels to cause the machine to stall at different detent positions, and wherein each of the different detent positions is in a different phase.

17. The drive as claimed in claim 11, wherein the processor is further configured to cause the control system to determine a speed of the machine and produce the second output in the detent region at the detent level if the speed is below a first value and produce the second output in the detent region at a level at or above the lower output limit if the speed is above a second value, wherein the second value is equal to or greater than the first value.

18. The drive as claimed in claim 11, wherein the brushless electrical machine has the output of the torque or the force and is coupled to a load through a compliant transmission arrangement for transmitting the output to the load.

19. The drive as claimed in claim 11, wherein the brushless electrical machine is coupled to one or more traction wheels of a vehicle.

20. The drive as claimed in claim 11, wherein the brushless electrical machine is a switched reluctance machine.

\* \* \* \* \*